April 12, 1949.   W. B. PETERSON, JR   2,467,154
NONCIRCULAR CAN SEAMING HEAD

Filed July 26, 1946   5 Sheets-Sheet 1

INVENTOR.
WILLIAM B. PETERSON, JR.
BY
ATTORNEY

April 12, 1949.　　　W. B. PETERSON, JR　　　2,467,154
NONCIRCULAR CAN SEAMING HEAD
Filed July 26, 1946　　　　　　　　　　5 Sheets-Sheet 2
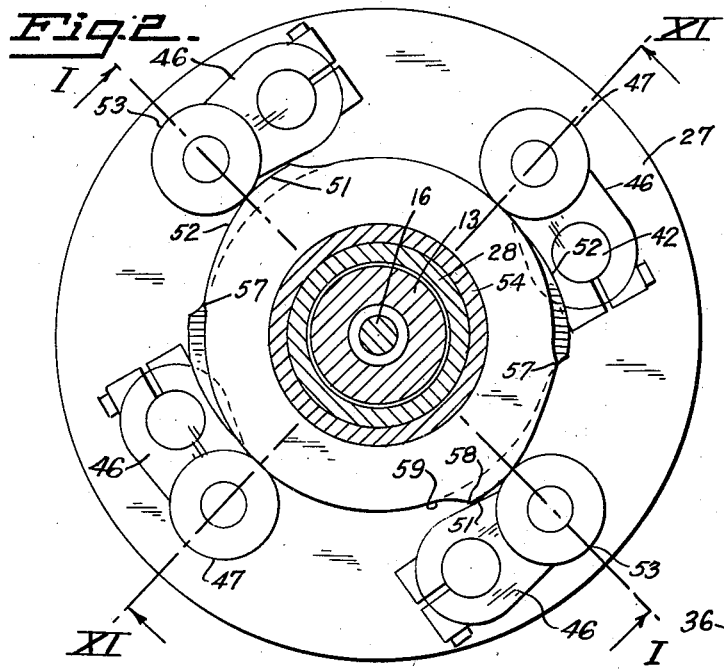
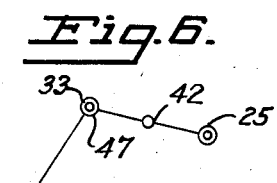
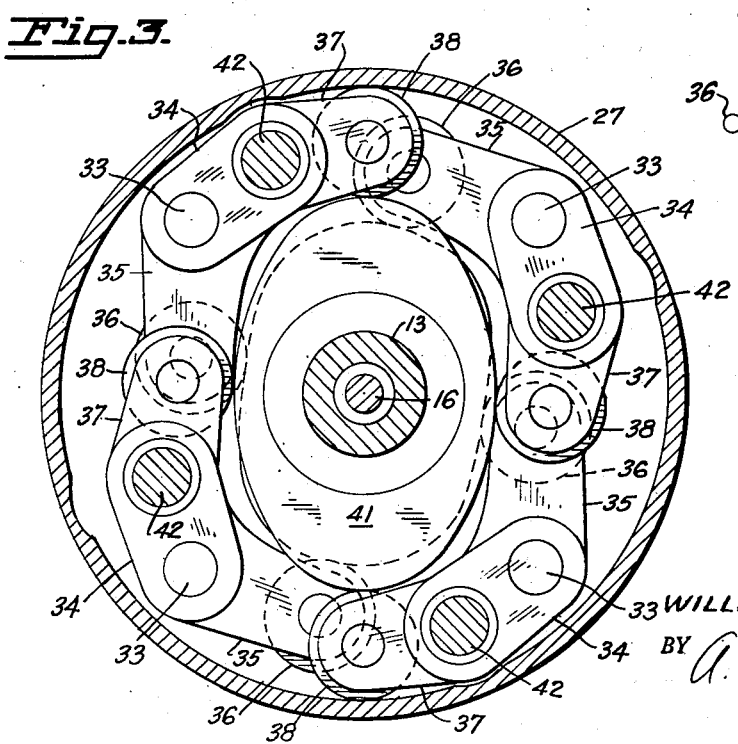
INVENTOR.
WILLIAM B. PETERSON, JR.
BY
ATTORNEY April 12, 1949.   W. B. PETERSON, JR   2,467,154
NONCIRCULAR CAN SEAMING HEAD
Filed July 26, 1946   5 Sheets-Sheet 3

INVENTOR.
WILLIAM B. PETERSON, JR.
BY
ATTORNEY

April 12, 1949.  W. B. PETERSON, JR  2,467,154
NONCIRCULAR CAN SEAMING HEAD
Filed July 26, 1946  5 Sheets-Sheet 4
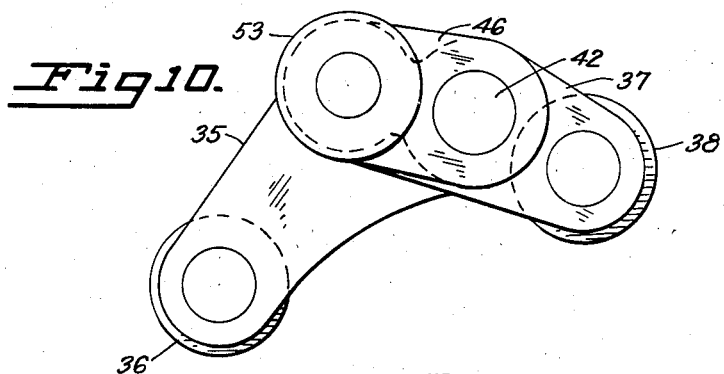
Fig.10.
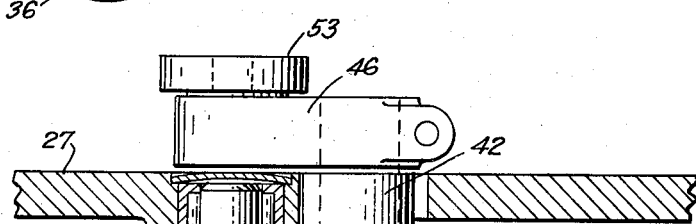
Fig.8.
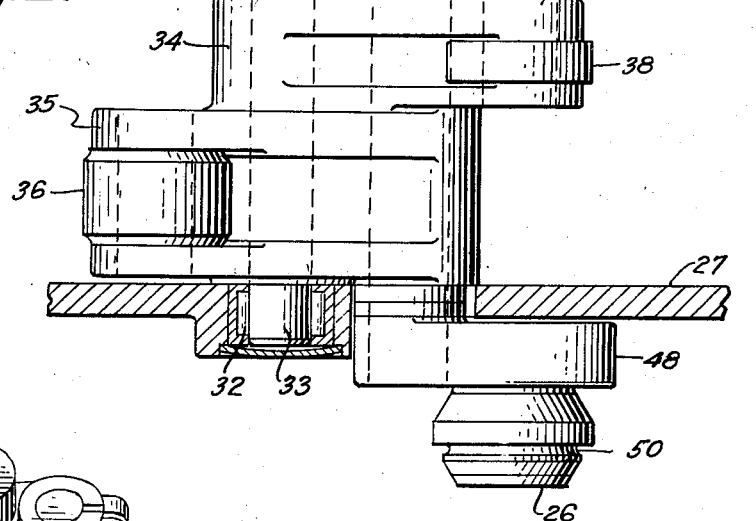
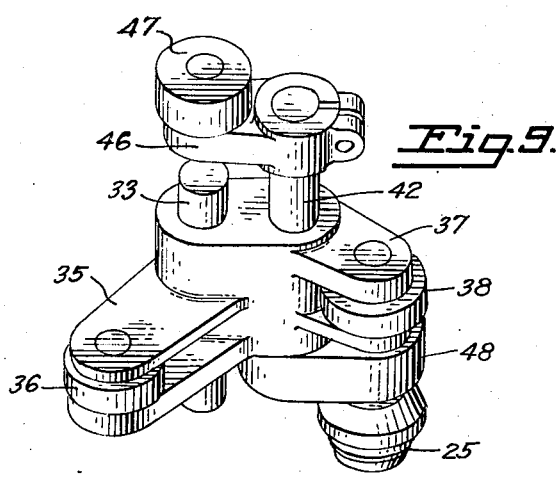
Fig.9.
INVENTOR.
WILLIAM B. PETERSON, JR
BY
ATTORNEY April 12, 1949.  W. B. PETERSON, JR  2,467,154
NONCIRCULAR CAN SEAMING HEAD
Filed July 26, 1946  5 Sheets-Sheet 5
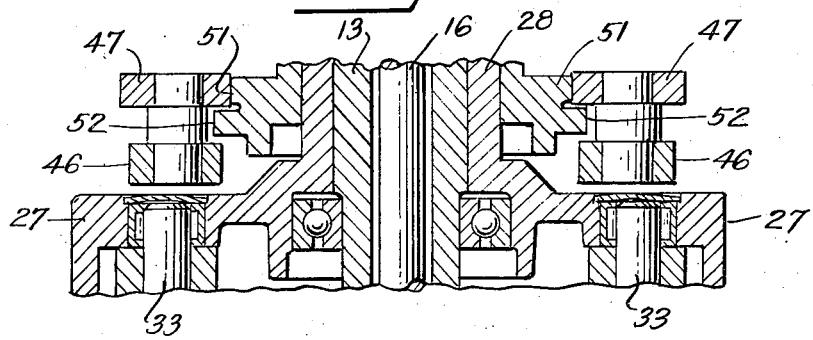
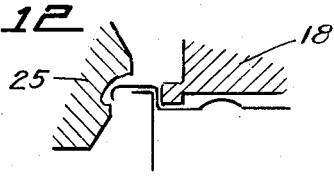
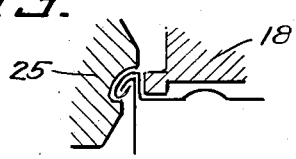
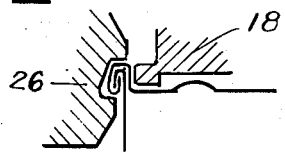
INVENTOR.
WILLIAM B. PETERSON, JR.
BY
ATTORNEY Patented Apr. 12, 1949

2,467,154

UNITED STATES PATENT OFFICE 2,467,154

NONCIRCULAR CAN SEAMING HEAD

William B. Peterson, Jr., San Francisco, Calif., assignor to Pacific Can Company, San Francisco, Calif., a corporation of Nevada Application July 26, 1946, Serial No. 686,525

3 Claims. (Cl. 113—24)

This invention relates to improvements in can seaming devices and particularly to devices for attaching an end or cover to a container of oval or other non-circular horizontal cross-section.

One of the objects of the invention is to provide a device in which the setup when changing from a container of one size or shape to one of another size or shape can be made with a minimum of time and adjustment.

Another object of the invention is to provide such a device having self-compensating means for handling the inevitable minor variations in the size and thickness of the lid and the container being closed.

Another object of the invention is to provide such a device which has a high operating efficiency and will handle a large number of cans per unit of time.

Other objects and advantages of the invention will become apparent from the following description and no attempt is made above to enumerate all the advantages inherent in this device.

In the drawings:

Fig. 2 is a plan view partly in cross-section taken on the line II—II of Fig. 1;

Fig. 3 and Fig. 4 are similar views taken on the lines III—III and IV—IV respectively of Fig. 1;

Figs. 6 and 7 are diagrammatic showings of the relative positions of a seaming roll with its floating mounting in the cam yoke;

Fig. 8 is a view in vertical elevation of the mounting and control means for one seaming roll;

Fig. 9 is a view in perspective of a seaming roll showing the floating mounting in which it is carried;

Fig. 10 is a top plan view of the floating mounting shown in Fig. 9;

Fig. 11 is a fragmentary view in vertical cross-section taken at right angles to the view in Fig. 1, to show the other set of roller actuating cams in working position;

Fig. 12 is a fragmentary cross-sectional view of the can lid and can flange edges showing the seaming roll retracted and the can lid just as it is first brought up onto the chuck;

Fig. 13 is a similar view of the above parts at the completion of the preliminary seaming operation; and Fig. 14 is a similar view at the completion of the final seaming operation.

The device of the present invention is designed to be incorporated in a can or container closing machine adapted to secure in place covers having an irregular shape. Such containers may be oval cans for packing sardines, or they may be rectangular cans with rounded corners. In either case the seaming rolls must follow a path conforming to the edge of the can lid, and in addition to following this path, they must also have another movement, namely, inwardly toward the edge of the can lid so as to spin or curl it into a locked seam with the outwardly flanged upper lip of the can or container wall. These operations are shown in Figs. 12, 13, and 14.

Figure 1:
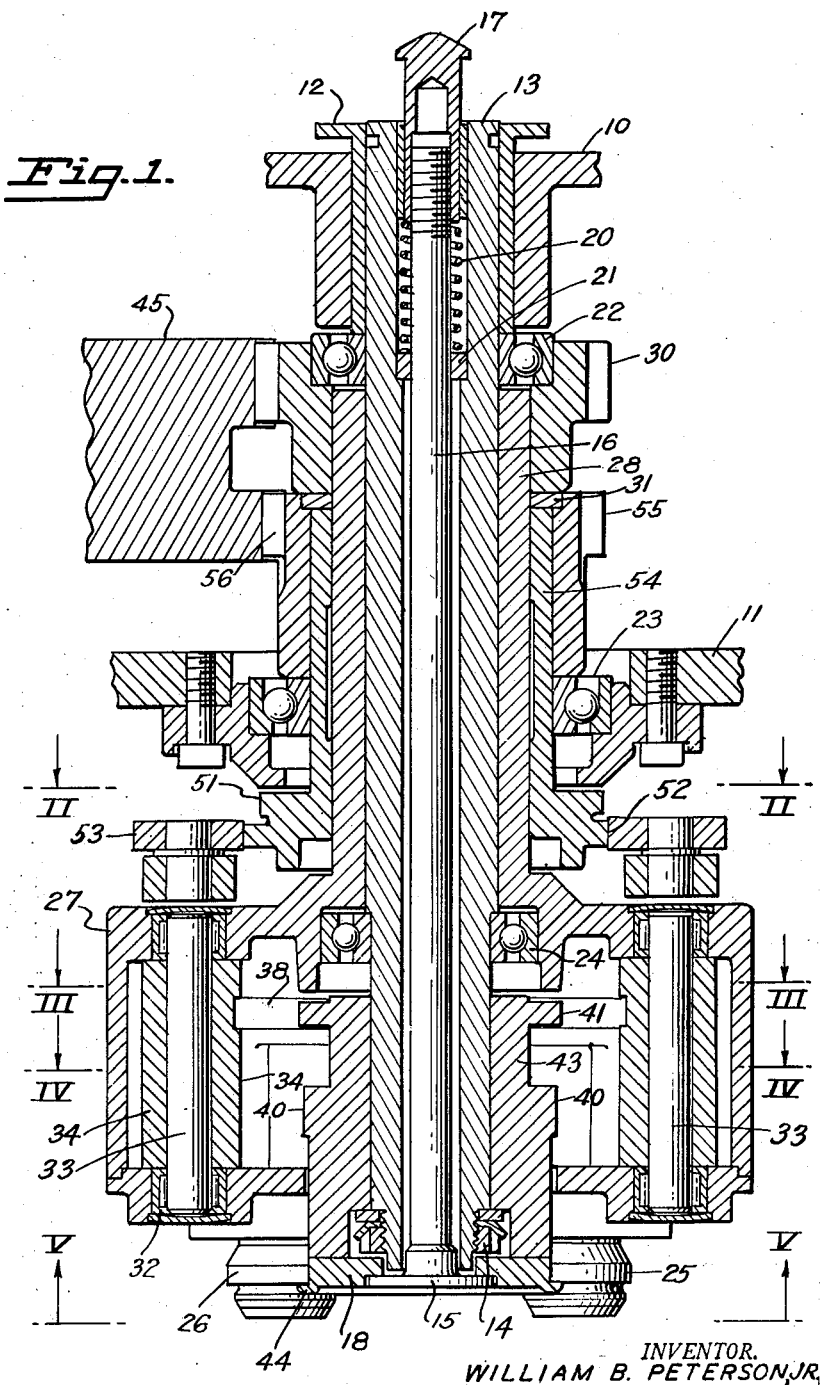
Fig. 1 is a view in vertical cross-section of the seaming head taken on the line I—I of Fig. 2 with portions of the turret housing in which it is mounted being broken away.
Figure 4:
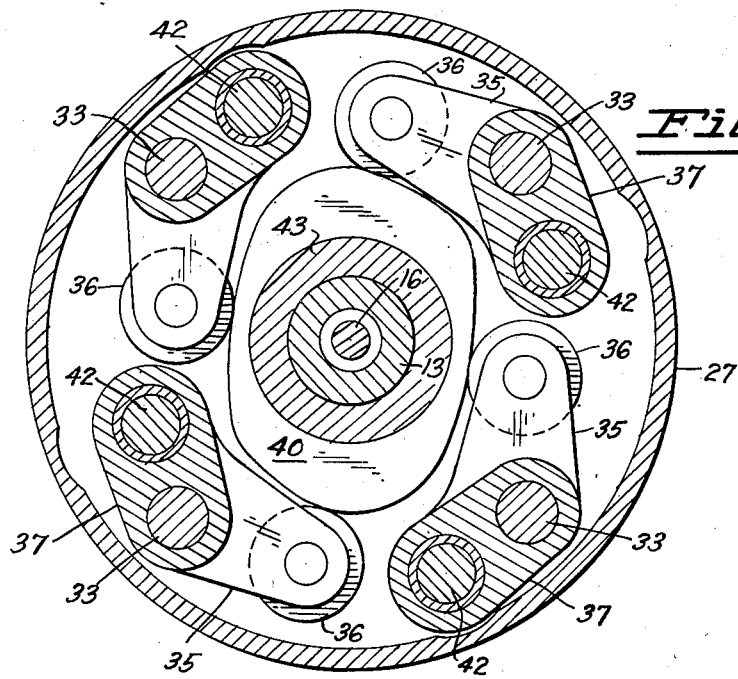

In Fig. 1 the head of the machine, which is usually in a turret form, is shown by the numerals 10 and 11. In the turret head 10 is a spindle adjusting sleeve 12 and an upper chuck spindle 13 which extends downwardly to the bottom of the seaming head in which it is fastened by means of the lock nut 14. The interior of the spindle 13 is bored out and has a recess at its lower end to receive the knock-out plate 15. A shaft 16 supports the plate 15 and at its top is secured the projecting knockout rod 17 adapted to be engaged at the end of each seaming operation by a cam or other member to knock the closed can out of the chuck 18 at the bottom of the seaming head. A spring 20 bears against the collar 21 which is resting on a ledge in the bore in the chuck spindle 13 and holds the knockout member in a raised position.

In this type of device the chuck 18 and the spindle 13 do not rotate; instead the rotating parts are mounted around the spindle 13 in suitable bearings 22, 23, and 24.

Figure 5:
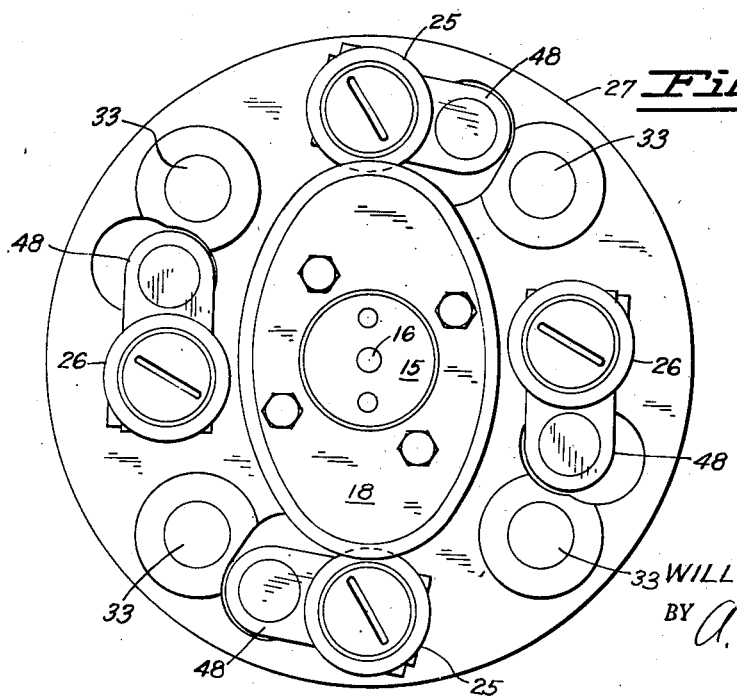
Fig. 5 is a plan view looking up at the bottom of the closing head.

In Fig. 5 of the drawings are shown four seaming rolls. The two numbered 25 are set opposite each other and effect the preliminary curling of the can lid and the flange on the top edge of the can. The two numbered 26 are the finishing rolls and complete the seaming or closing operation. Each pair of rolls is arranged to be brought into operative position at the desired time.

Around the lower part of the spindle 13 is mounted the circular seaming head casing 27 bored out to receive the bearing 24 and having an upwardly extending sleeve 28, all arranged to rotate relative to the spindle 13. Keyed to the upper end of the sleeve 28 is the head drive gear 30 which is bored out to receive the bearing 22. A thrust washer 31 positions the sleeve 28 and the gear 30 in relation to the turret head 11 and the thrust bearing 23.

In suitable bearings 32 spaced around the seaming head casing 27 are mounted yoke pivot pins 33. There are four in the present device because there are four seaming rolls 25 and 26. If there were more or fewer seaming rolls there would be more or fewer yoke pins. These pins 33 rotatably support the conjugate cam yoke 34 having on one side of the pin 33 a lever portion or arm 35 with a cam roller 36 and on its other side a lever portion or arm 37 with a cam roller 38. The roller 36 is on the lever 35 opposite to the lever 37 supporting the seaming roll 25 (see Fig. 8) and therefore since it is the working roller it is preferably made wider and heavier than the roller 38 which might be termed the slave roller. The latter's function is to maintain the roller 36 in contact with the actuating cam face 40.

In Fig. 1 the numeral 40 denotes the conjugate cam on which the roller 36 engages, and the numeral 41 denotes the slave cam or track engaged by the roller 38. The shape of these cams 40 and 41 should be such as to cause the center line of the seaming rollers 25 and 26 to travel in a path corresponding to the shape of the can lid being secured to the can. These cams 40 and 41 are non-rotatively secured near the bottom of the chuck spindle 13. Also attached to the body 43 of these cams is the lid receiving chuck 18, having its perimeter 44 shaped to fit down inside of the container lid when the lid and the container are elevated into engagement with the chuck 18 (see Fig. 12). On this machine the seaming rolls 25 and 26 travel around the lid to accomplish this seaming operation as shown in Figs. 13 and 14. The gear ratios are such that the seaming head 27 is rotated 11½ times for each complete seaming cycle. This is done through the drive gear 45 and the pinion gear 30.

To accomplish the inward movement of the seaming rolls 25 and 26 as they complete the seam, these seaming rolls are carried on a floating mounting including in each case a torsion shaft 42 having a lever 46 attached at its upper end and carrying a cam roller 47 (see Fig. 9) and having an oppositely directed lever or arm 48 in which a seaming roll 25 is journaled. By making the shaft 42 of substantial length a certain bending or torsional effect is obtained which relieves the strain between the cam roller 47 on the lever 46 and the seaming roll 25 on the lever 48, when varying thicknesses of metal and other imperfections in the parts being seamed impose an extra load or strain on the parts. This is an important advantage of the construction shown.

The device shown has the two pairs of seaming rolls 25 and 26. The opposite pair 25 is arranged to be brought into engagement with the flanged edge of the can lid first so as to impart a preliminary curl to these parts as shown in Fig. 13. To do this, the surface 50 is shaped to bring the lid flange and the can body flange to the desired preliminary curled position. At this stage, the other pair of seaming rolls 26 having differently shaped surfaces 50 designed to complete the seam on the can end, are brought into contact with the edge of the lid and move inwardly to flatten and complete the seam as shown in Fig. 14.

The pair of seaming rolls 25 is moved into position against the lid end in the chuck 18 by means of the cam 51 which is engaged by the roller 47.

Directly below the cam 51 is the cam 52 adapted to be engaged by a cam roller 53 (see Figs. 1 and 8) mounted on the lever 46 and connected to the lever 48 which carries the seaming roll 26.

The cams 51 and 52 are formed as part of the sleeve 54 to which is keyed the gear 55 in engagement with the lower set of teeth 56 on the driving gear 45.

It will be noted that the gear 55 is slightly smaller than the gear 30 and that both gears are driven from the gear 45 with suitable teeth and diameters to match the size of the gears 55 and 30. These sizes are arranged so that as the gear 55 makes 12 revolutions, the gear 30 will make 11½ revolutions. The half revolution difference allows the cam faces 51 and 52 (see Fig. 2) to move 180° with relation to the seaming head body 27.

As shown in Fig. 2, the cam rollers 53, each of which actuates a final seaming roll 26, are at the top of the cams 52 so that the seam is completed as shown in Fig. 13. The cam rollers 47 which actuate the preliminary seaming rolls 25 have moved down off the high points on the cams 51. When the cam rollers 47 and 53 are riding on the low spots on the cams 51 and 52 respectively, the seaming rolls 25 and 26 are backed away from the chuck 18 far enough to allow a can lid and can to be moved up into position under the chuck as shown in Fig. 12. About four of the 11½ turns of the seaming head 27 are used up in taking out the seamed can and introducing a new one into position under the chuck 18. When the lid and can have come into position under the chuck 18, as shown in Fig. 12, the cam rollers 47 have moved about to the position on the cam 51 indicated by the numerals 57. As the cam rollers 47 advance up the cam 51, they move each preliminary seaming roll 25 from the position shown diagrammatically in Fig. 7 into the position shown in Fig. 6. When the rollers 47 reach the end 58 of the cam and the roller drops down into the valley 59 of the cam, the seaming roll 25 moves back into the position shown in Fig. 7. There is about a half revolution of the seaming head 27 between the time that the cam roller 47 lets the seaming rolls 25 move away from the can seam until the cam rollers 53, controlling the finish seaming rolls 26, begin to climb on the cam 52 and move the seaming rolls 26 in far enough to flatten and complete the seam as shown in Fig. 14. About two and a half turns of the head is given to this operation of imparting the final curl or closing of the seam of the container and the cover.

As shown in Figs. 9 and 11, the torsion shafts 42 carrying the preliminary seaming rolls 25 is a little longer than on the ones carrying the rolls 26 so as to position the cam rollers 47 higher to engage the cams 51.

The floating mounting of the seaming rolls 25 and 26 can be easily seen by looking at Figs. 8 and 9. The cam rollers 36 and 38 bear on the cams 40 and 41 which conform to the irregular shape of the container lid being secured to the can. This means that the arms 35 and 37 of the conjugate cam yoke 34 will move in the path necessary to carry the seaming rolls 25 and 26 around the container lid. To enable the seaming roll 25, which imparts the preliminary curl to the lid and container lip, to move into operative position at the right time and to be out of the way the balance of the time the seaming roll 25 is mounted on its own lever or arm 48 secured to the torsion shaft 42 and actuated by the cam 51 and the cam roller 47 on the arm 46. During the short time the roller 47 is dwelling on the high point of the cam 51, the seaming roll 25 is in alignment vertically with the cam roller 38, and the seaming cam roller 47 is in alignment vertically with the pivot shaft 33, so that the movement of the yoke 34 and the parts mounted in it will not change relation as the irregular lid contour is followed. The shape of the working face 50 of the roll 25, as shown in Fig. 13 imparts the preliminary curl to the lid and to the can flange. The finishing rolls 26 are similarly mounted and are actuated, as above described, by cam 52. They are shaped to impart the final seaming of the can lid to the can body as shown in Fig. 14.

It is to be understood that the form of my invention, herewith shown and described, is to be taken as a preferred example, and that various changes in the shape, size and arrangement of parts may be resorted to, without departing from the spirit of my invention or the scope of the subjoined claims.

I claim:

1. In combination, mechanism for conforming the path of a can seaming roll to a non-circular outline, comprising, a seaming roll, an arm on which said roll is mounted, a cam-engaging arm carrying first cam engaging means, a torsion shaft, said arms being directly attached to opposite ends of said shaft, whereby said arms may shift relative to each other to compensate for minor variations in size and thickness of the lid and can being closed, an integral, conjugate cam-engaging yoke, said yoke having a hub, a pair of opposed levers extending from said hub, second cam-engaging means on one of said levers, and third cam-engaging means on the other of said levers, said torsion shaft extending through and being journaled in said hub, and a pivot on said yoke disposed between said levers and spaced from said torsion shaft for mounting said mechanism in a rotatable driving head.

2. A flange seaming head for attaching covers to non-circular containers, including a plurality of seaming rolls, part of the rolls having a contour to impart a preliminary curl to the cover and the others having a contour to complete the seaming operation, each roll having in association an arm on which each roll is mounted, a shaft secured to said arm, and an actuating arm secured to the shaft at its end opposite the first named arm; a first cam roller on said actuating arm; an integral, conjugate cam yoke in which the shaft is journaled and through which said shaft extends, a second cam roller on one side of the pivot point of the yoke, a third cam roller on the other side of the pivot point of the yoke, one of said last-named cam rollers being arranged substantially co-axially with the seaming roll carried in said yoke when the latter is swung into its final seaming position; a rotating head in which said cam yokes are journaled; drive means for rotating said head about the cover to be attached; a frame in which said rotating head is mounted; a chuck in said frame for holding the cover during the seaming operation; a pair of cams in said frame engaged by the aforesaid second and third cam rollers and shaped to move the cam yokes in a path to conform to the cover as the head rotates; a cam sleeve surrounding the head drive means; a pair of cams on the sleeve, one cam being shaped to engage the first cam rollers of the actuating arms which control the seaming rolls to impart the preliminary curl, and the other cam being shaped to engage the first cam rollers of the actuating arms which control the seaming rolls to complete the seaming operation; and means to rotate the cam sleeve and its cam relatively to the rotation of the head.

3. In a seaming head for cans of irregular shape, the combination of a frame to support said head; a chuck non-rotatably mounted in said frame; means for bringing a can and a can lid into position under said chuck; a head body supported in said frame and rotatable around said chuck; means for rotating said head body; a plurality of integral, conjugate cam yokes reciprocably mounted in said body and having a pair of opposed cam-engaging means; a plurality of seaming rolls, each seaming roll being carried on an arm and a torsion shaft which is rotatably mounted in and extends through one of said yokes; a pair of non-rotatable cam means engaged by said opposed cam engaging means as said body is rotated, said cam means being shaped to carry each yoke during a part of the seaming cycle in a path corresponding to the shape of the can lid being applied and to retract it during the balance of the cycle; and a third cam means adapted to be engaged by a lever arm directly connected to said torsion shaft at its end opposite to said first mentioned arm, said cam being shaped to move said seaming roll in against the lid as the seaming operation is carried on.

WILLIAM B. PETERSON, JR.

REFERENCES CITED

The following references are of record in the file of this patent:

UNITED STATES PATENTS

| Number | Name | Date |
| --- | --- | --- |
| 1,972,862 | Birkland | Sept. 11, 1934 |
| 1,972,866 | Butler | Sept. 11, 1934 |
| 1,972,878 | Erb | Sept. 11, 1934 |
| 2,149,543 | Peyser et al | Mar. 7, 1939 |
| 2,193,981 | Peyser | Mar. 19, 1940 |